(12) United States Patent
Kanodia et al.

(10) Patent No.: US 6,402,414 B1
(45) Date of Patent: Jun. 11, 2002

(54) EFFICIENT TUBULAR BODY JOINT

(75) Inventors: Vinod Laxmichand Kanodia, Rochester Hills; Ronny B. Karlsson, Troy, both of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/517,106

(22) Filed: Mar. 7, 2000

(51) Int. Cl.[7] ................................................ B25G 3/00
(52) U.S. Cl. ...................... 403/230; 296/188; 296/205; 296/30; 52/556.9; 52/726.1
(58) Field of Search .................................. 296/188, 204, 296/205, 29, 30; 52/656.9, 655.1, 712, 649.2, 650.1, 726.1; 29/890.148; 403/270, 272, 271, 345, 46, 387, 388, 393, 230, 231, 240, 187

(56) References Cited

U.S. PATENT DOCUMENTS

| | | | | |
|---|---|---|---|---|
| 361,507 A | * | 4/1887 | Hambay | |
| 389,180 A | * | 9/1888 | Wiggins | |
| 1,220,770 A | * | 3/1917 | Murray | |
| 1,807,186 A | * | 5/1931 | Warner | |
| 2,088,961 A | * | 8/1937 | Jordan | |
| 2,389,907 A | * | 11/1945 | Helmuth | |
| 2,730,385 A | * | 1/1956 | Kuehne, Jr. | |
| 2,874,708 A | * | 2/1959 | Daus | |
| 3,726,551 A | * | 4/1973 | Levenberg | |
| 4,125,973 A | * | 11/1978 | Lendrihas | |
| 4,253,224 A | * | 3/1981 | Hickman et al. | |
| 4,618,163 A | * | 10/1986 | Hasler et al. | |
| 5,094,504 A | * | 3/1992 | Wurl | |
| 5,228,259 A | * | 7/1993 | Haddad et al. | |
| 5,271,687 A | * | 12/1993 | Holka et al. | |
| 5,383,723 A | * | 1/1995 | Meyer | |
| 6,123,378 A | * | 9/2000 | Teply et al. | |

* cited by examiner

Primary Examiner—Lynne H. Browne
Assistant Examiner—Tomlyn A Malcolm
(74) Attorney, Agent, or Firm—Laura C. Hargitt

(57) ABSTRACT

A frame structure includes tubular elements joined by an efficient tubular joint with internal low mass stiffening members including a central hollow box section. In the more mass efficient embodiments, the box section includes sides forming continuous extensions through the joint of all the sides of the tubular elements and all edges of each side are fixed to the connecting sides at the joint. In less efficient embodiments provided to simplify manufacturing, some of the interior edges may not be fixed to adjacent sides and/or one or more sides may be omitted from the hollow box section. All versions include extensions of at least part of the sides of each tubular element through the joint to provide mass efficient internal strengthening of the joint for use in tubular frames made with hydroformed or other tubular components.

10 Claims, 6 Drawing Sheets

EFFICIENT TUBULAR BODY JOINT

TECHNICAL FIELD

This invention relates to joints for connecting tubular structural members, such as supporting frames and beams for vehicle bodies, and more particularly to a hollow joint structure providing efficient interior stiffening of the connecting joint for tubular members.

BACKGROUND OF THE INVENTION

It is known in the art relating to tubular frame structures to connect the tubular members at angularly intersecting joints using various forms of stiffening including overlapping elements, as well internal and external gussets or stiffener plates. With an increasing reliance on hydroformed tubular frame members joined together for supporting the body structure and other members in automotive vehicles, there is often limited room for the application of external braces or gussets. Overlapping joint constructions may be used but often provide a less than desired strength in torsional or bending modes. Internal gussets have been proposed but are often difficult to apply. Thus, a need for a more efficient joint construction providing increased strength with a minimum of additional mass or assembly difficulty is desired.

SUMMARY OF THE INVENTION

The present invention provides a hollow joint construction between tubular members of a frame structure that is particularly desirable for hydroformed members, although applicable to tubular structures of various types.

A primary feature of a frame structure incorporating the invention is that the joint is defined by a hollow box section including sides that form continuous extensions through the joint of preferably all the sides of the tubular members that are being joined. Also, the edges of the joint sides are welded or integrally connected to one another and are likewise connected with the sides of the tubular members or elements that are joined by the joint.

Where appropriate, less desirable alternative constructions formed according to the invention may omit one of the interior extension walls of the joint or may have some of the edges of the joint sides disconnected from adjacent tubular members in order to simplify manufacturing while still providing some of the advantages of the fully connected and fully strengthened idealized joint arrangement.

These and other features and advantages of the invention will be more fully understood from the following description of certain specific embodiments of the invention taken together with the accompanying drawings.

DESCRIPTION OF THE PREFERRED EMBODIMENT

The invention is described primarily by reference to various embodiments of T-joints connecting rectangular hydroformed tubular members illustrated by the various figures. However, it should be understood that the invention is equally applicable to other forms of joints than T-joints and other cross-sectional configurations of tubular members than rectangular members, including, for example, cylindrical or circular cross section members.

Figure 1:
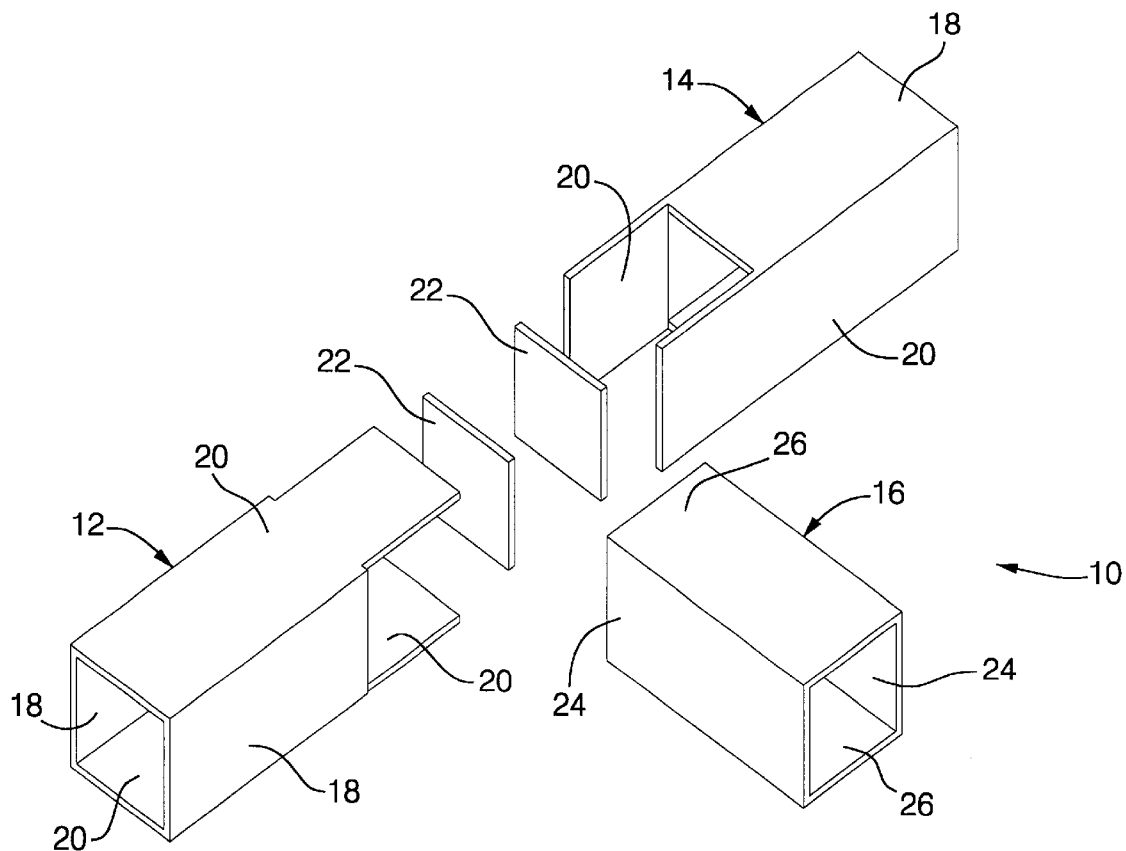
FIG. 1 is a pictorial exploded view showing a first idealized embodiment of the invention.
Figure 2:
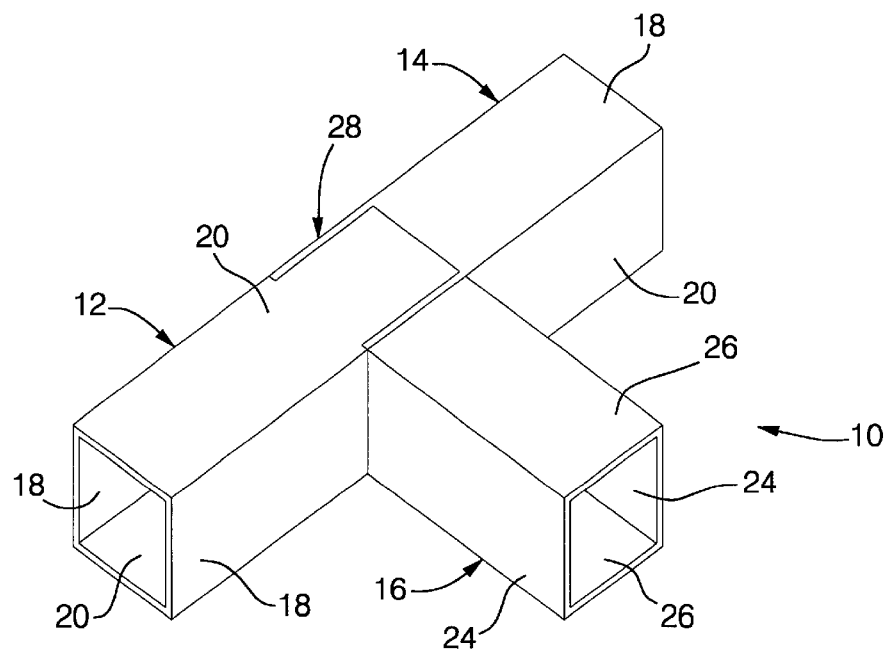
FIG. 2 is a pictorial view showing the completed assembly of the embodiment of FIG. 1.

Referring first to FIGS. 1 and 2 of the drawings, numeral 10 generally indicates a frame structure having first and second longitudinally aligned hydroformed tubular members 12, 14 connected in a T-joint with a third hydroformed tubular member 16. The members are all of square or rectangular cross section and have essentially identical cross-sectional dimensions at the joint location.

Members 12 and 14 are preferably formed as a single hydroformed tube which is then cut apart at the joint location. The cut forms short sides 18 alternately positioned with long sides 20 to form interlocking ends which are ultimately joined in assembly of the joint members. Supporting bulkheads 22 are welded transversely across the interiors of the hollow members 12, 14 at inner ends of the short sides 18 of each of the members 12, 14. The bulkheads are welded on all four edges to both the short sides 18 and long sides 20 of their respective members 12, 14. The two members 12, 14 are then interconnected by joining the cut edges in their original positions and the cut edges of both the long and the short sides are welded together so that all the edges are secured together. Finally, the third tubular member 16 is welded to one side of the joined members 12, 14. Laterally spaced sides 24 of member 16 are aligned with the internal bulkheads 22 and vertically spaced sides 26 are aligned with the corresponding upper and lower sides of the assembled members 12, 14.

The final joint, as shown in FIG. 2, then comprises a central hollow box section 28 having six closed sides with fully welded edges joining the three tubular members 12, 14, 16 in a T-joint. The box section 28 is formed by the projecting portions of the long sides 20 of members 12 and 14 and the welded bulkheads 22 which form internal extensions of the sides 24 of tubular member 16. The finished joint therefore effectively provides extensions of all of the sides of all the tubular members completely through the joint so that the joint structure is fully strengthened internally by the hollow box section which forms the central structural element of the joint. In effect, the box section of FIG. 2 defines a joint that extends across all the tubular elements to their far sides and each of the sides of the tubular elements is aligned through the full depth of the joint with one of the sides of the box section. The idealized joint adds only the bulkheads 22 to the finished tubular joint or frame structure, thereby accomplishing the desired strengthening of the joint in an efficient manner with a minimum addition of mass.

Figure 3:
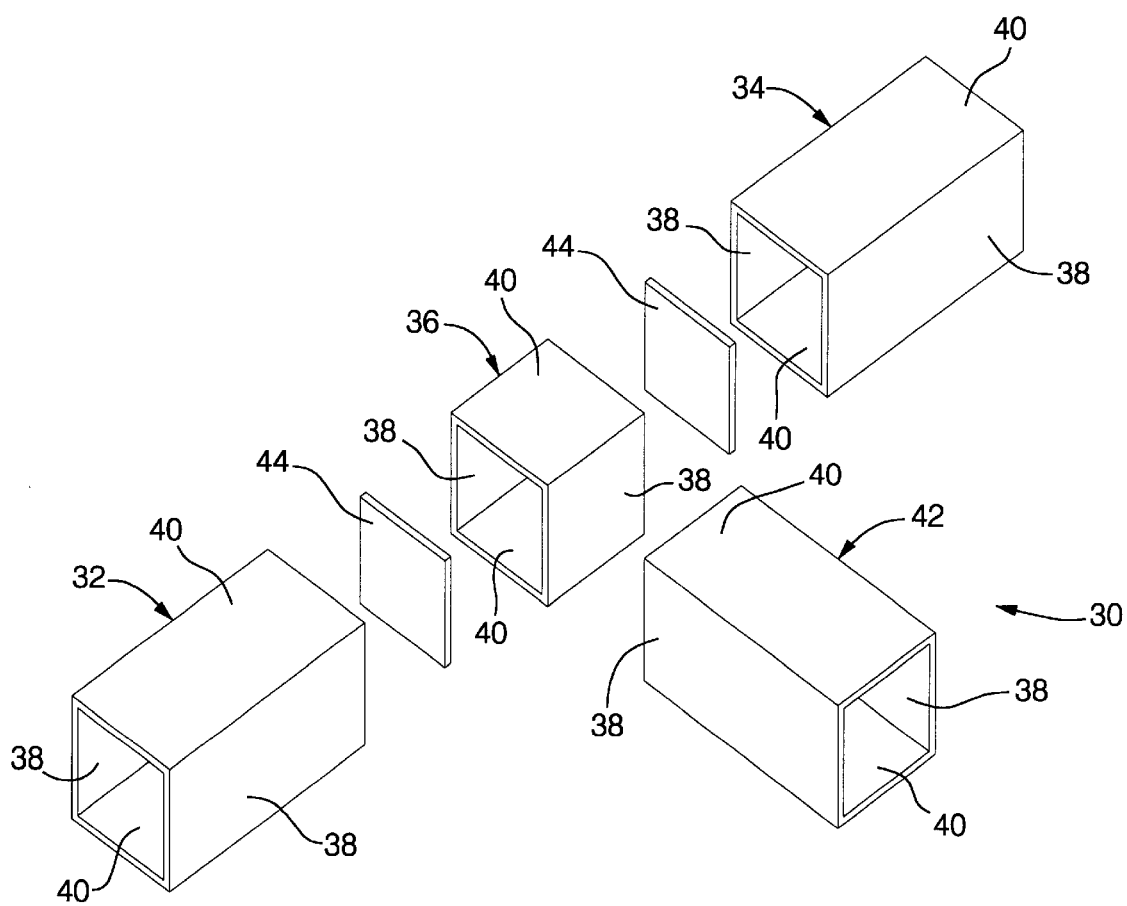
FIG. 3 is a pictorial exploded view of a second idealized embodiment of the invention.

Referring next to FIG. 3 of the drawings, there is shown in exploded assembly a second embodiment of fully strengthened frame structure according to the invention and generally indicated by numeral 30. Structure 30 is preferably formed in part from a single hydroformed tube cut into three longitudinally aligned sections. These include, as shown, a left section 32, right section 34 and center section 36. The sections all include laterally spaced sides 38 and vertically spaced sides 40 and are optionally formed as generally square or rectangular box sections. A third hydroformed tubular member 42 also has laterally and vertically spaced sides 38, 40 and is positioned in assembly to form a T-joint with the other elements of the frame structure.

The center section 36 forms an open-ended box section. A pair of square or rectangular bulkheads 44 are welded to the open ends of the center section to form a closed box section having all edges of the sides welded together or integrally formed so that the closed box provides a strengthened structural support.

In final assembly, the left and right sections 32, 34 have their inner edges welded to the center box section 36 around the peripheries of the bulkheads 44. The tubular member 42 is then positioned against the near side 38 of the center box section and the edges of the side 38 and ends of member 42 are welded together. The result is a T-joint with all of the edges of the joint components fixed together to form a fully strengthened assembly which, when assembled, functions and appears structurally the same as the T-joint of the previously described embodiment of FIG. 2. The only difference in the resulting assembly is which edges are welded together and which are integral so that the ultimate strength of the assembly and its function are essentially the same in either case.

The embodiments so far described represent examples of fully strengthened T-joints having rectangular elements with a central closed box section in which the sides of the tubular members are provided with continuous extensions through the joint and all of the edges of the connected sections are fixed together to provide the fully strengthened joint. The following several embodiments represent alternative embodiments of the invention in which the joint is less than fully strengthened due to modification for simplified manufacturing while still representing increased strength and efficiency from a mass standpoint over comparable joints of the prior art.

Figure 4:
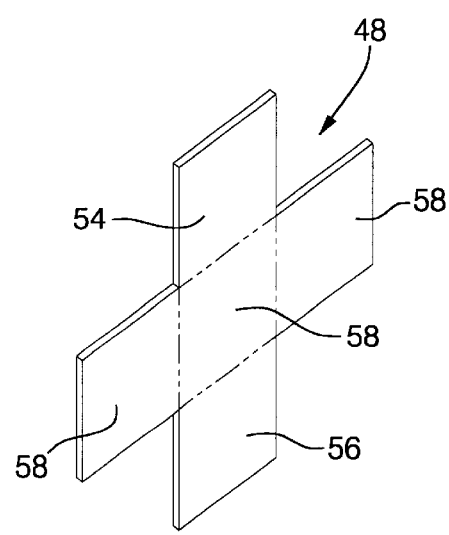
FIG. 4 is a pictorial view of a blank for forming an open sided box section of the embodiment of FIGS. 5 and 6.
Figures 5, 6:
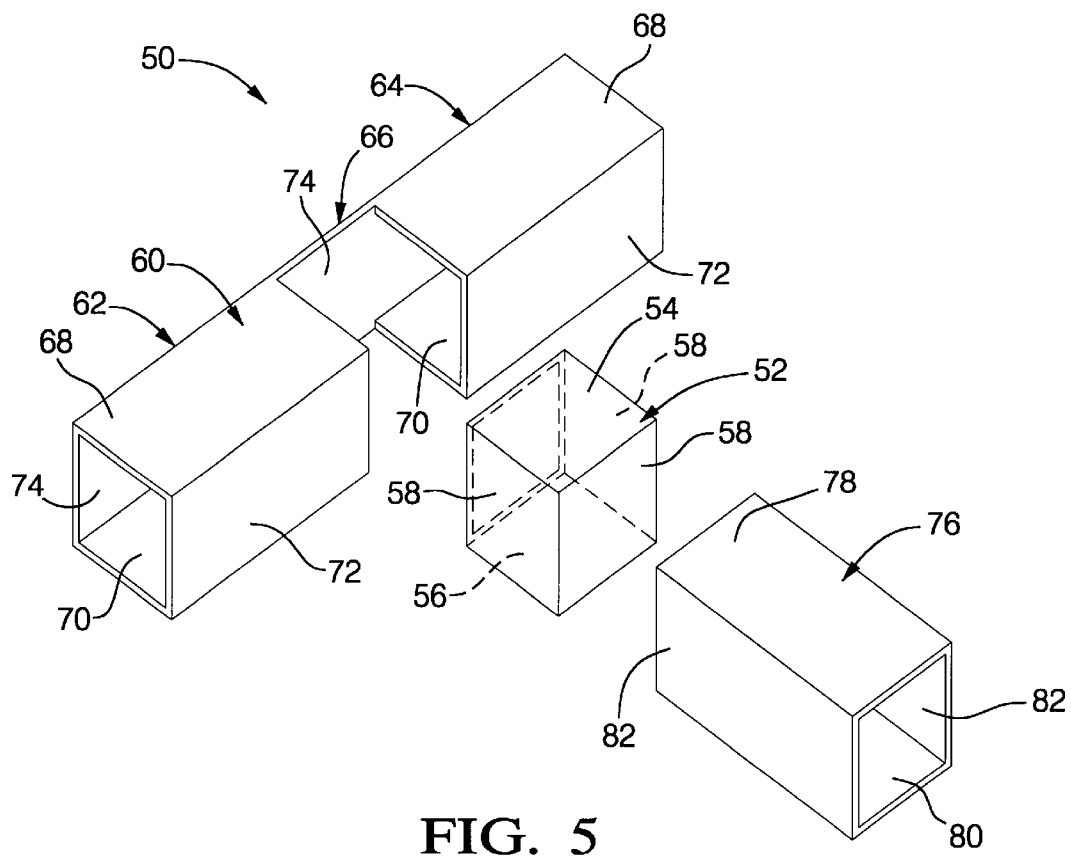
FIG. 5 is a pictorial exploded view of a third non-idealized embodiment of the invention.
FIG. 6 is a pictorial view showing the assembled components of the embodiment of FIG. 5.

FIG. 4 illustrates a sheet metal blank 48 formed as a cross and adapted to be integrated into a frame structure 50 as shown in FIGS. 5 and 6. FIG. 5 shows the structure 50 in exploded assembly while FIG. 6 illustrates the completed assembled structure 50. In forming the assembly, the sheet metal blank 48 is first formed into a rectangular or cubic box section 52. The box section includes upper and lower sides 54, 56 as well as three peripheral sides 58 extending vertically, as shown in the drawings. A far side of the box section 52 is open so that there is no fourth peripheral side 58 at this location.

An integral tubular member 60, which may be hydroformed, includes a left section 62, right section 64 and a center section 66. The left and right sections 62, 64 include upper and lower sides 68, 70, as well as front and rear sides 72, 74. In the center section 66, the upper, lower and front sides have been cut out, leaving only a rear side 74 in that portion of the member 60. Into this center section, the five-sided box section 52 is assembled with its open side being closed by engagement with the rear side 74 of the center section 66. The outer edges of upper and lower sides 54, 56, as well as the vertically extending near edges of sides 58 of box section 52, are then welded to the adjacent edges of the tubular member 60 so that a strengthened joint is formed. However, the edges of the longitudinally spaced sides 58 of the box which lie along the rear side 74 of the center section and extend vertically between the upper and lower sides are not welded to the rear side 74 so that the strength of the joint is reduced to some extent from that of the previously described embodiments.

To complete the frame structure 50, an additional tubular member 76 having upper, lower and laterally spaced sides 78, 80, 82, respectively, is positioned with inner edges of its sides engaging the edges of the outer side of the box section 52. Member 76 is welded to the box section 52 to form a T-joint frame structure in which all but two of the edges of the structure in the joint are welded or otherwise fixed together by integral assembly, as previously described. Dashed lines 84 in FIG. 6 indicate positions on the interior of rear side 74 of tubular member 60 where the unwelded edges of the box section 52 are located.

Figure 7:
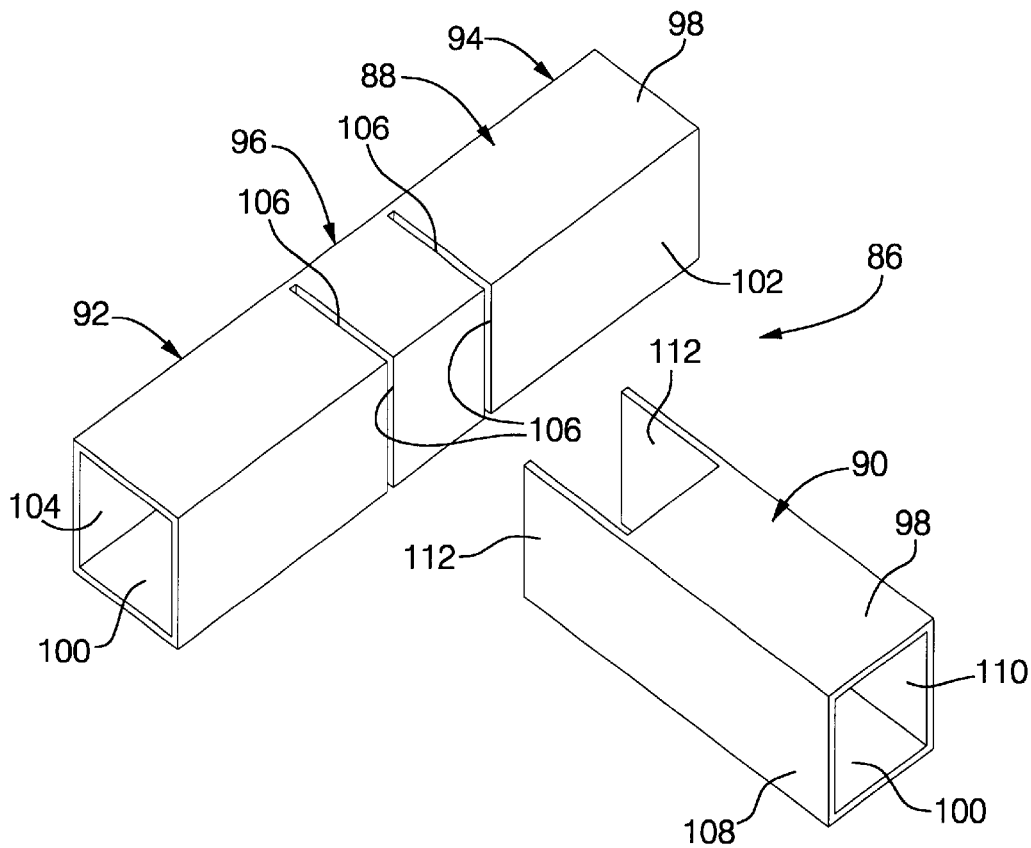
FIG. 7 is a pictorial exploded view showing a fourth non-idealized embodiment of the invention.
Figure 8:
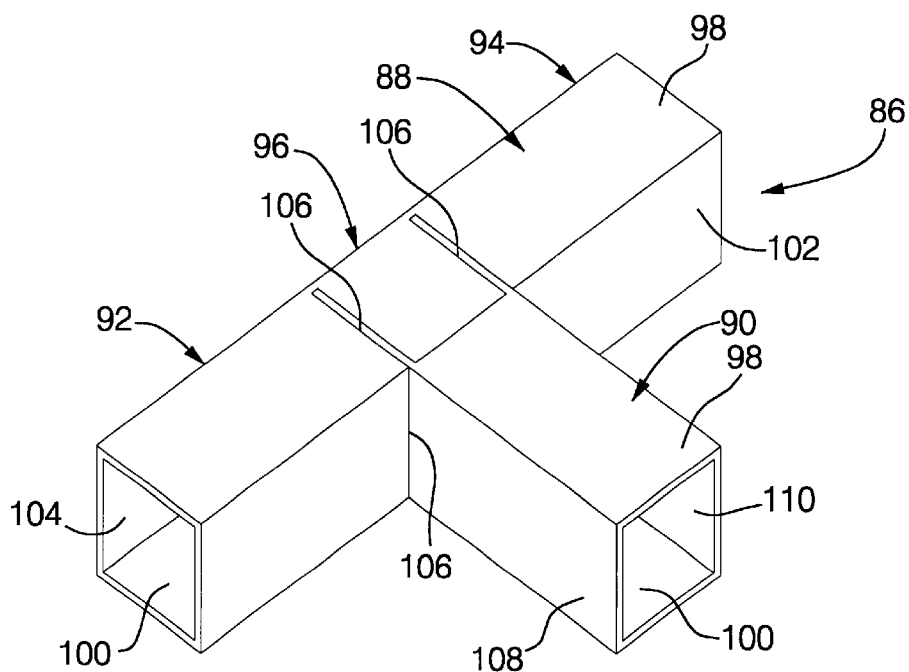
FIG. 8 is a pictorial view showing the assembled components of the embodiment of FIG. 7.

FIGS. 7 and 8 illustrate yet another alternative assembly according to the invention but having less than all edges of the joint elements fixed to one another. A frame structure 86 is formed from two hydroformed tubular members 88, 90. Again, tubular member 88 includes left, right and center sections 92, 94, 96, respectively, each having upper, lower, front and rear sides 98, 100, 102, 104, respectively. Slots 106 are cut into the upper, lower and front sides 98, 100, 102, thus separating the center section 96 from the left and right sections 92, 94. However, the common rear side 104 remains unslotted and thus the complete tubular member 88 remains intact as an integral structure.

Tubular member 90 also includes upper and lower sides 98, 100, as well as left and rights sides 108, 110. The upper and lower sides 98, 100 are cut away at the inner end leaving laterally spaced extended portions 112 projecting as inner extensions of the left and right sides 108, 110. These extensions 112 in assembly are inserted through the slots 106 in the front side 102 of tubular member 88 and extend in engagement with the cut edges of the upper and lower slots 106 to engage the rear side 104 of the center and left and right sections of the tubular member 88.

The exposed edges of the joint, including the edges at all of the slots 106 as well as at the engagement of the short sides 98, 100, with the like numbered sides of the tubular member 88, are then welded so that most of the edges are fixed together. Exceptions are the vertically extending edges of the extended portions 112 which engage the rear side 104 of member 88 and the inner edges of the slots 106 cut into the front sides 102 which engage the inner faces of extended portions 112 of sides 108, 110 of tubular member 90. These portions are not able to be welded after assembly and thus reduce somewhat the strength of the joint but still provide strengthening walls forming extensions of all sides of the tubular members forming the joint through the joint itself.

Figure 9:
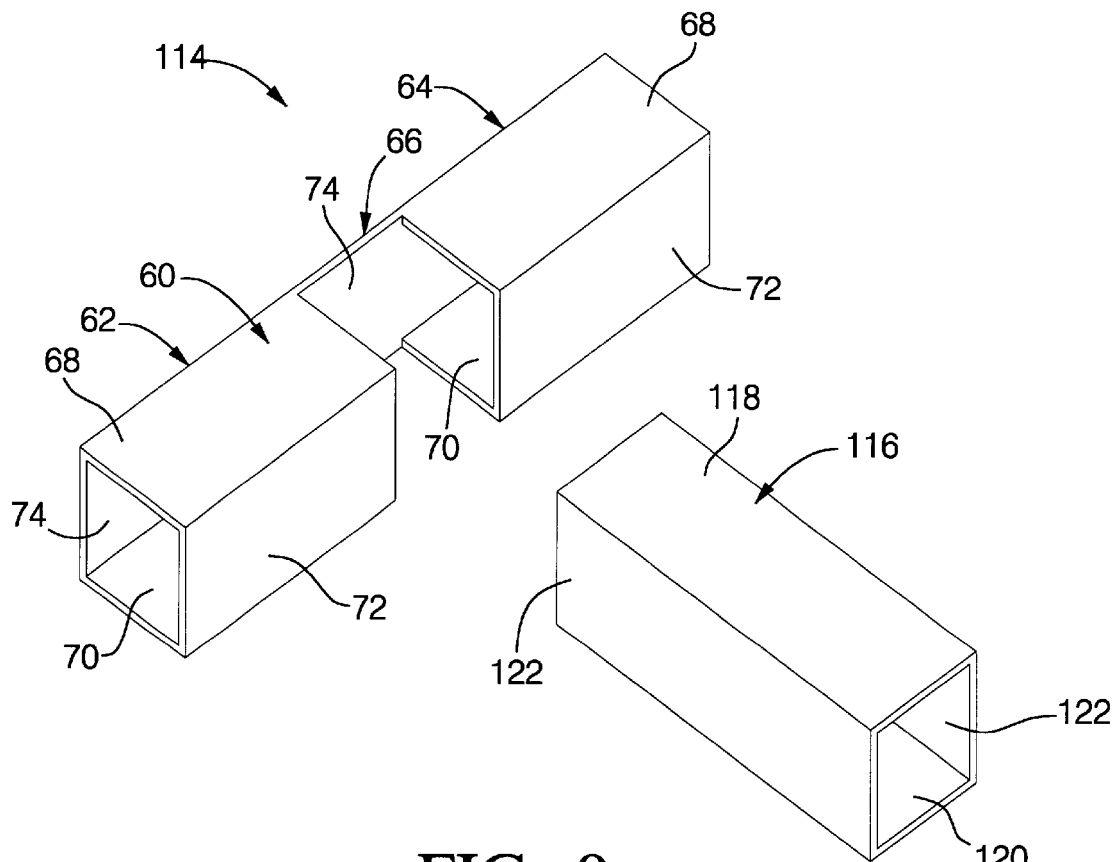
FIG. 9 is a pictorial exploded view showing a fifth non-idealized embodiment of the invention.
Figure 10:
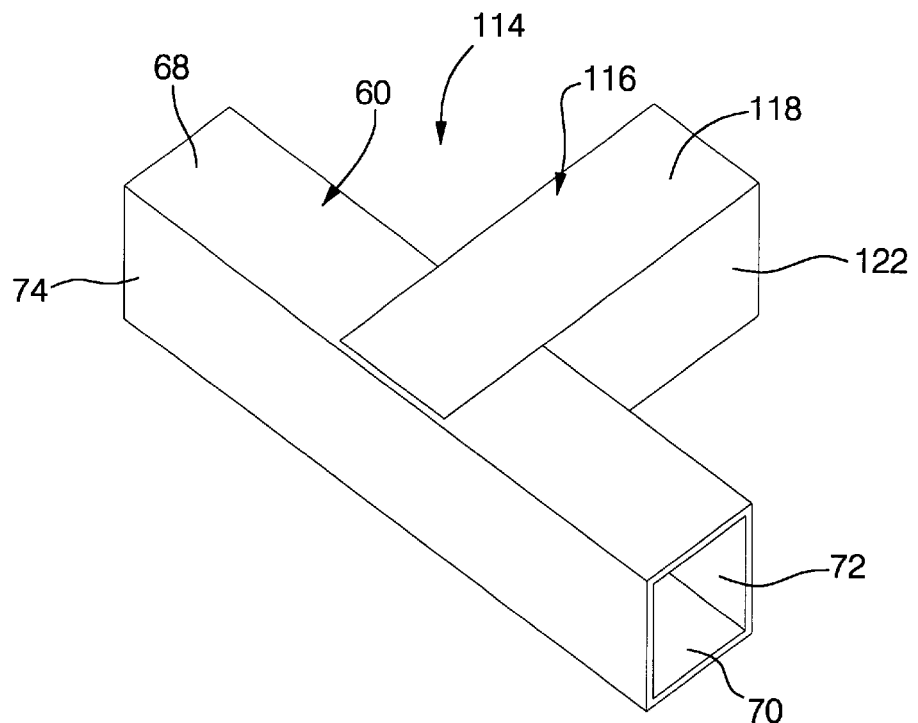
FIG. 10 is a pictorial view showing the assembled components of the embodiment of FIG. 9.

Referring now to FIGS. 9 and 10 of the drawings, there is shown still another alternative embodiment of frame structure generally indicated by numeral 114 and defining a modified joint structure in accordance with the invention.

Structure 114 is formed, in part, from a tubular member 60 like that of the embodiment of FIG. 5 and wherein like numerals indicate like parts. Thus, member 60 includes left, right and center sections 62, 64, 66, respectively. All three sections include a rear side 74 which is continuous while the left and right sections further include upper sides 68, lower sides 70 and front sides 72. The upper, lower and front sides are cut out of the center section leaving only the rear side 74, as previously mentioned, and providing a rectangular space or opening between the left and right sections which is closed by the rear side 74.

The structure 114 further includes a second tubular member 116 which has squared ends, as well as upper, lower and laterally spaced sides 118, 120, 122, respectively. One end of the tubular member 116 is inserted directly into the opening between the left and right sections 62, 64 of tubular member 60 so that the inner ends of the laterally spaced sides 122 engage the rear side 74 of the center section 66. In addition, the upper and lower sides 118, 120 are aligned with the upper and lower sides 68, 70 of the tubular member 60. The exposed edges of all these sides are then welded together at their points of engagement with one another so that a strengthened but not fully stiffened joint structure is provided as illustrated.

In this structure 114, the points of engagement of the laterally spaced sides 122 of member 116 with the rear walls 74 of member 60 are not welded since they cannot be easily reached. In addition, the central box section has only five sides instead of the desired six. These five sides of the box section are made up of the rear side 74 of member 60, the laterally spaced sides 122 and the upper and lower sides 118, 120 of member 116. However, there is no internal side forming an extension within the joint of the front sides 72 of the left and right sections of member 60 so that the joint is not as fully strengthened as the previously described frame structures, but still provides strengthening as compared with prior art joints while adding a simplified manufacturing process.

Figure 11:
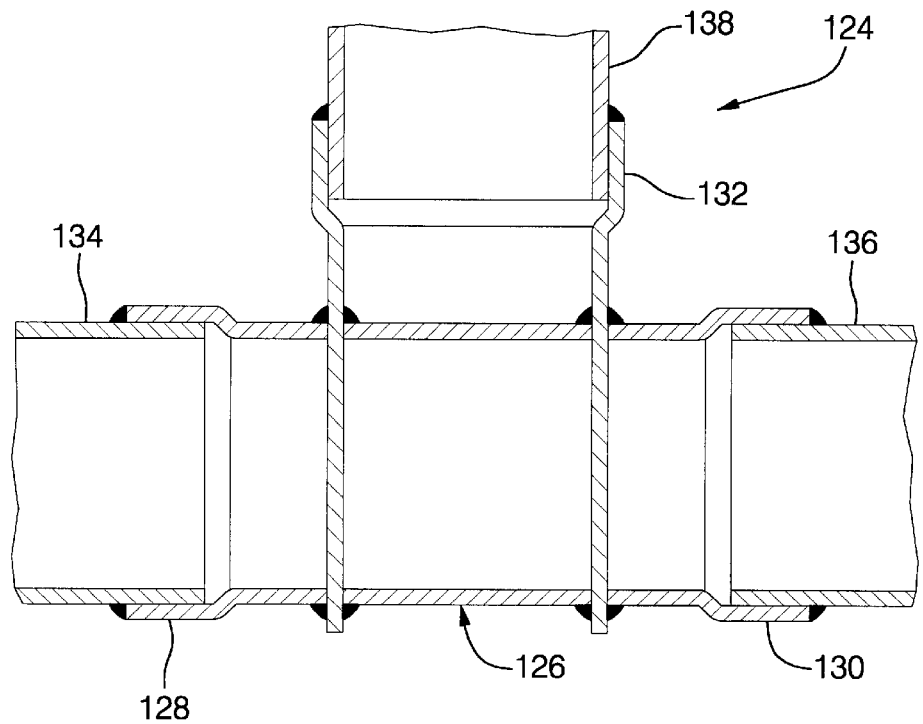
FIG. 11 is a schematic view indicating the application of slip joint connections to any desired embodiment of the invention.

Referring now to FIG. 11, a frame structure 124 is illustrated in which a central joint portion 126 is shown as representative of any of the previously illustrated joints or others which may be made according to the invention. Again, joint 126 is formed as a T-joint, although other forms of joint construction could be equally well made in accordance with the invention. The central joint portion 126 includes first and second longitudinally aligned ends 128, 130 and a laterally extending end 132. All of the these ends 128, 130, 132 are expanded to define annular recesses into which additional tubular members 134, 136, 138 may be telescopically inserted and positioned as desired to form the assembled frame structure 124. Tubes 134, 136, 138 are then welded in place to complete formation of the structure.

Figure 12:
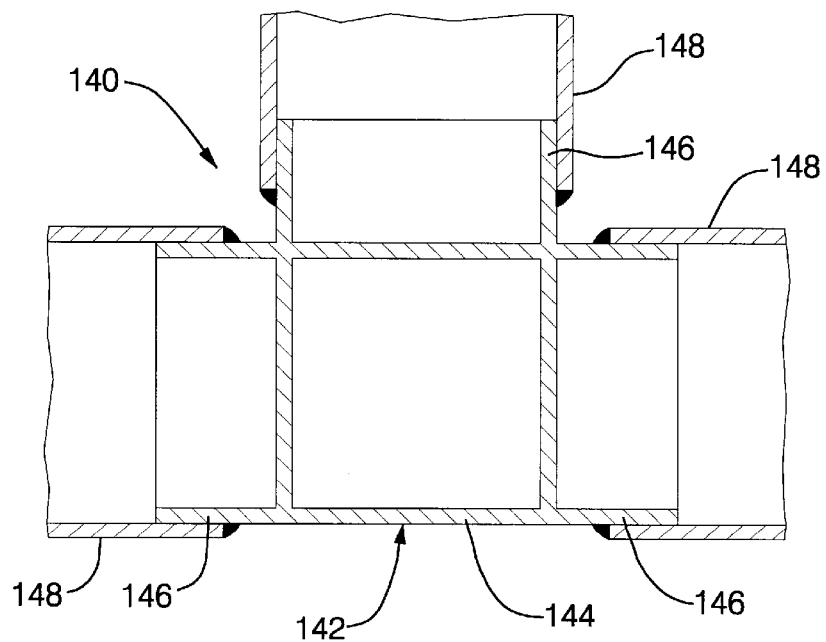
FIG. 12 is a cross-sectional view illustrating the use of cast nodes for the central joint structure including a stiffening box section and having telescoping attachment of tubular members to tubular elements integrally formed with the box section.

Referring last to FIG. 12 of the drawings, numeral 140 generally indicates a frame structure illustrating yet another exemplary embodiment of the invention. Frame structure 140 includes a central cast member 142 which includes integrally formed a central six sided hollow box section 144 having extending therefrom in three directions, tubular extensions 146 which, in each case, form extensions of the side walls of the box section 144. The box section and the associated tubular extensions, as illustrated, represent rectangular or square tubular portions. However, they could be configured in any suitable tubular cross section which may be desired in a particular structural assembly.

To complete the frame structure 140, additional tubular members 148 are telescopingly received over the tubular extensions 146 and are positioned, as desired, to form the frame structure 140 after which members 148 are each welded around their inner peripheries to the tubular extensions 146 to form a fully strengthened joint structure, as described in accordance with the invention. The embodiment of FIG. 12 is of the fully strengthened type similar to those formed by other methods and described in FIGS. 1–3 of the drawings.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

We claim:

1. A frame structure comprising a plurality of tubular elements connected at a common joint that effectively extends across all the tubular elements to their far sides;

said elements each having at least one side with a predefined cross-section at its connection with said joint; and said joint defined by a hollow box section including sides forming continuous extensions through the full depth of the joint of at least one half of the sides of each tubular element and continuously connected over at least one half the periphery of each element, such that at least half of the sides of each tubular element are each aligned through the full depth of the joint with one of the sides of the box section;

said sides of the box section having edges of which more than half are fixed to connecting portions of said elements.

2. A frame structure as in claim 1 wherein the sides of said hollow box section form continuous extensions through the joint of all the sides of said tubular elements, such that all the sides of each tubular element are each aligned with one of the sides of the box section.

3. A frame structure as in claim 2 wherein said tubular elements have generally rectangular cross-sections at said joint and all the edges of the joint sides are fixed to connecting portions of said tubular elements.

4. A frame structure as in claim 3 and further including tubular members welded to said tubular elements.

5. A frame structure as in claim 4 wherein said tubular members are telescopingly connected with said tubular elements prior to being welded to said elements.

6. A frame structure as in claim 3 wherein said box section is made from formed and welded sheet metal.

7. A frame structure as in claim 3 wherein said tubular elements comprise tubular members welded to the box section.

8. A frame structure as in claim 3 wherein said box section is a casting.

9. A frame structure as in claim 8 wherein said tubular elements comprise extensions of said casting.

10. A frame structure as in claim 2 wherein said tubular elements have generally rectangular cross-sections at said joint and at least two thirds of the edges of the joint sides are fixed to connecting portions of said tubular elements.

* * * * *